(12) United States Patent
Kim et al.

(10) Patent No.: US 7,248,697 B2
(45) Date of Patent: Jul. 24, 2007

(54) APPARATUS AND METHOD FOR SCRAMBLING AND DESCRAMBLING DATA WORDWISE IN OPTICAL DISK SYSTEM

(75) Inventors: Dae-Woong Kim, Seoul (KR); Soo-Woong Lee, Seongnam (KR)

(73) Assignee: Samsung Electronics, Co., Ltd. (KR)

( * ) Notice: Subject to any disclaimer, the term of this patent is extended or adjusted under 35 U.S.C. 154(b) by 768 days.

(21) Appl. No.: 10/632,612

(22) Filed: Aug. 1, 2003

(65) Prior Publication Data
US 2004/0067046 A1    Apr. 8, 2004

(30) Foreign Application Priority Data
Oct. 7, 2002   (KR) .................... 10-2002-0061047

(51) Int. Cl.
    *H04L 9/00*      (2006.01)
    *H04N 7/167*     (2006.01)
(52) U.S. Cl. ......................... 380/265; 380/210
(58) Field of Classification Search ........... 380/265, 380/210; 714/731, 775; 369/59.24, 59.23, 369/124.08, 272.1, 275.3
See application file for complete search history.

(56) References Cited

U.S. PATENT DOCUMENTS 4,410,990 A * 10/1983 Wilkinson ................. 714/798
4,802,152 A * 1/1989 Markvoort et al. ........ 369/30.22
5,917,914 A    6/1999 Shaw et al. .................... 380/42
5,987,630 A   11/1999 Yamawaki .................... 714/701
6,158,026 A   12/2000 Kawahara .................... 714/701

FOREIGN PATENT DOCUMENTS

KR   01-09500    2/2001
WO   0193265    12/2001

* cited by examiner

Primary Examiner—Hosuk Song
(74) Attorney, Agent, or Firm—Mills & Onello, LLP

(57) ABSTRACT

An apparatus and a method for scrambling and descrambling data wordwise in an optical disk system are provided. The apparatus includes a bit storing means which stores at least 15 bits, and a calculating means which calculates first through fifteenth bits of the bit storing means in parallel during one clock cycle and inputs the results of the calculation back into the bit storing means. The calculating means performs an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit, and inputs the results of the XOR logic operations into the bit storing means.

9 Claims, 5 Drawing Sheets

| INITIAL SETTING VALUE | INITIAL VALUE | INITIAL SETTING VALUE | INITIAL VALUE |
|---|---|---|---|
| 0H | 0001H | 8H | 0010H |
| 1H | 5500H | 9H | 5000H |
| 2H | 0002H | AH | 0020H |
| 3H | 2A00H | BH | 2001H |
| 4H | 0004H | CH | 0040H |
| 5H | 5400H | DH | 4002H |
| 6H | 0008H | EH | 0080H |
| 7H | 2800H | FH | 0005H |

| LFSR(n) | LFSR(n+1) |
|---|---|
| R15 | R7 |
| R14 | R6 |
| R13 | R5 |
| R12 | R4 |
| R11 | R3 |
| R10 | R2 |
| R9 | R1 |
| R8 | R15⊕R11 |
| R7 | R14⊕R10 |
| R6 | R13⊕R9 |
| R5 | R12⊕R8 |
| R4 | R11⊕R7 |
| R3 | R10⊕R6 |
| R2 | R9 ⊕R5 |
| R1 | R8 ⊕R4 |

FIG. 7

| LFSR(n) | LFSR(n+1) | USB | LSB |
|---|---|---|---|
| R15 | R14⊕R10 | | |
| R14 | R13⊕R9 | | |
| R13 | R12⊕R8 | | |
| R12 | R11⊕R7 | | |
| R11 | R10⊕R6 | | |
| R10 | R9 ⊕R5 | | |
| R9 | R8 ⊕R4 | | |
| R8 | R7 ⊕R3 | R7 ⊕R3 | R15⊕R11 |
| R7 | R6 ⊕R2 | R6 ⊕R2 | R14⊕R10 |
| R6 | R5 ⊕R1 | R5 ⊕R1 | R13⊕R9 |
| R5 | R15⊕R11⊕R4 | R15⊕R11⊕R4 | R12⊕R8 |
| R4 | R14⊕R10⊕R3 | R14⊕R10⊕R3 | R11⊕R7 |
| R3 | R13⊕R9 ⊕R2 | R13⊕R9 ⊕R2 | R10⊕R6 |
| R2 | R12⊕R8 ⊕R1 | R12⊕R8 ⊕R1 | R9 ⊕R5 |
| R1 | R15⊕R7 | R15⊕R7 | R8 ⊕R4 |

APPARATUS AND METHOD FOR SCRAMBLING AND DESCRAMBLING DATA WORDWISE IN OPTICAL DISK SYSTEM

BACKGROUND OF THE INVENTION

This application claims the priority of Korean Patent Application No. 2002-61047, filed Oct. 7, 2002, in the Korean Intellectual Property Office, the contents of which are incorporated herein in their entirety by reference.

1. Field of the Invention

The present invention relates to an optical disk system, and more particularly, to an apparatus and a method for scrambling and descrambling digital versatile disk (DVD) data in an integrated circuit for processing digital signals of a DVD system.

2. Description of the Related Art

Optical disk systems record data on optical disks, such as compact disks (CDs) or DVDs, and reproduce data recorded on optical disks. In particular, in reproducing digital data stored on an optical disk using an optical disk reproducer, a pickup device is used to radiate a laser beam on tracks of the optical disk, detect whether there are pits on the optical disk based on variation in the intensity of reflected light, and reproduce the digital data using the results of the detection. Such an optical disk reproducer is shown in FIG. 1.

FIG. 1 is a block diagram of a conventional optical disk reproducer. As shown in FIG. 1, a conventional optical disk reproducer includes a servo unit 110, a radio frequency (RF) unit 120, a digital signal processor (DSP) 130, a memory 140, and a MPEG unit 150.

The RF unit 120 converts light reflected from an optical disk 170 into electrical signals and outputs data signals and various error signals. The servo unit 110 converts the data signals and error signals output from the RF unit 120 into digital signals and controls the optical disk 170 in response to the error signals.

The DSP unit 130 receives signals which have been converted into digital signals by slicing in the RF unit 120, and performs various signal processing operations, such as EFM demodulation, error correction, and descrambling, on the signals. Here, data generated during each of the signal processing operations are temporarily stored in the memory 140. If data demodulated by an EFM demodulator 131 are stored in the memory 140, an error correction block 132 draws the EFM-demodulated data from the memory and performs error correction on the EFM-demodulated data. The error-corrected data are stored in the memory 140 and then are descrambled by a descrambler 133.

The data having been through such digital signal processing are MPEG-decoded in the MPEG unit 150, and then the MPEG-decoded data are output to a display or a speaker 160.

According to DVD standards applied to disks exclusively for being reproduced, data to be recorded on a disk are scrambled in accordance with the following. First, as shown in FIG. 2, scrambling bytes are generated. In order to generate such scrambling bytes, a linear feedback shift register (LFSR) 200 is generally used. The LFSR is a shift register constituted by fifteen bits and is set to a predetermined initial value in accordance with an initial setting value, as shown in FIG. 3. For example, when an initial setting value is 'OH', an LFSR 200 is initialized at '0001H'. When the initial setting value is '1H', the LFSR 200 is initialized at '5500H'. In general, the initial setting value used to determine an initial value of the LFSR 200 sequentially changes sectorwise. Among the fifteen bits of the LFSR 200 shown in FIG. 2, eight lower bits R1 through R8 are used as scrambling bits.

The LFSR 200 shown in FIG. 2 performs an XOR logic operation on an eleventh bit R11 and a fifteenth bit R15 and inputs the result of the XOR logic operation in a first bit R1. Thereafter, the fifteen bits R1 through R15 are shifted one by one. The XOR operation and the shifting operation are alternately performed. The values of the first through fifteenth bits R1 through R15 of the LFSR 200 obtained after performing the XOR logic operation and the shifting operation eight times are shown in FIG. 4. Among the first through fifteenth bits R1 through R15 shown in FIG. 4, the eight lower bits R1 through R8 are used as scrambling bytes. Scrambling is performed by performing an XOR logic operation on data and the scrambling bytes, as shown in Equation (1).

$$SD = UD \oplus SB \quad (1)$$

In Equation (1), UD represents data before being scrambled, SB represents scrambling bytes, SD represents scrambled data, and $\oplus$ represents an XOR logic operation.

In order to retrieve the original data from the scrambled data, the scrambled data is descrambled. Descrambling is performed by performing an XOR logic operation on the scrambled data and the scrambling bytes, as shown in Equation (2).

$$UD = SD \oplus SB \quad (2)$$

In order to obtain the scrambling bytes, a bitwise operation has been performed in the prior art. According to conventional techniques, 8 clock cycles are taken to obtain one scrambling byte by performing a predetermined operation on one bit every clock cycle.

However, memories currently adopted in most DVD systems are mostly synchronous DRAM devices operating at a DVD speed of ×16. A device operating at a speed of ×16 means that 16 bits are simultaneously input to or output from the device. Accordingly, scrambled data from a memory can be operated on 16 bits at a time. Accordingly, if a scrambling byte is generated so that 16 bits are generated every clock cycle, the speed of scrambling and descrambling data will increase.

SUMMARY OF THE INVENTION

The present invention provides an apparatus for generating a scrambling word and an apparatus for scrambling and descrambling data in a DVD system, which can increase the speed of scrambling and descrambling data.

The present invention also provides a method for scrambling and descrambling data in a DVD system, which can increase the speed of scrambling and descrambling data.

According to an aspect of the present invention, there is provided an apparatus for scrambling and descrambling data in an optical disk system. The apparatus includes a shift register which is initialized at a predetermined initial value and which generates 16 bits of a scrambling word at a time using a predetermined parallel operation. An XOR logic operator performs an XOR logic operation on the scrambling word and every bit of scrambled data or descrambled data corresponding to the scrambling word.

In one embodiment, the shift register is a 15-bit shift register.

In one embodiment, the shift register performs an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit. The shift register stores the results of the XOR logic operations in the first through fifteenth bits, respectively.

In one embodiment, 8 upper bits of the scrambling word are the first through eighth bits of the shift register, and 8 lower bits of the scrambling word are the results of the XOR logic operations performed on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, on the tenth bit and the fourteenth bit, and on the eleventh bit and the fifteenth bit.

In one embodiment, 16 bits of the scrambled data or the descrambled data are read from a memory in the optical disk system in parallel at a time.

According to another aspect of the present invention, there is provided an apparatus for generating a scrambling word used to scramble and descramble data in an optical disk system. The apparatus includes a bit storing means which stores at least 15 bits, and a calculating means which calculates first through fifteenth bits of the bit storing means in parallel during one clock cycle and inputs the results of the calculation back into the bit storing means. The calculating means performs an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit. The calculating means inputs the results of the XOR logic operations into the bit storing means.

In one embodiment, 8 upper bits of the scrambling word are the first through eighth bits of the bit storing means, and 8 lower bits of the scrambling word are the results of the XOR logic operations performed on the fourth bit and the eighth bit, on the fifth bit and the ninth bit, on the sixth bit and the tenth bit, on the seventh bit and the eleventh bit, on the eight bit and the twelfth bit, on the ninth bit and the thirteenth bit, on the tenth bit and the fourteenth bit, and on the eleventh bit and the fifteenth bit.

According to still another aspect of the present invention, there is provided a method for scrambling and descrambling data in an optical disk system. The method includes (a) generating a predetermined scrambling word, and (b) performing an XOR logic operation on the scrambling word and scrambled data or descrambled data. The scrambling word includes 16 bits and is generated through a parallel operation performed using a shift register.

In one embodiment, step (a) comprises performing an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit, and storing the results of the XOR logic operations in the first through fifteenth bits, respectively.

In one embodiment, step (a) comprises generating the first through eighth bits of the shift register as 8 upper bits of the scrambling word, and generating the results of the XOR logic operations performed on the fourth bit and the eight bit, on the fifth bit and the ninth bit, on the sixth bit and the tenth bit, on the seventh bit and the eleventh bit, on the eight bit and the twelfth bit, on the ninth bit and the thirteenth bit, on the tenth bit and the fourteenth bit, and on the eleventh bit and the fifteenth bit as 8 lower bits of the scrambling word.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 7 is a table showing the results of an operation performed in the LFSR shown in FIG. 6 during one clock cycle.

DETAILED DESCRIPTION OF THE INVENTION

Figures 4, 5:
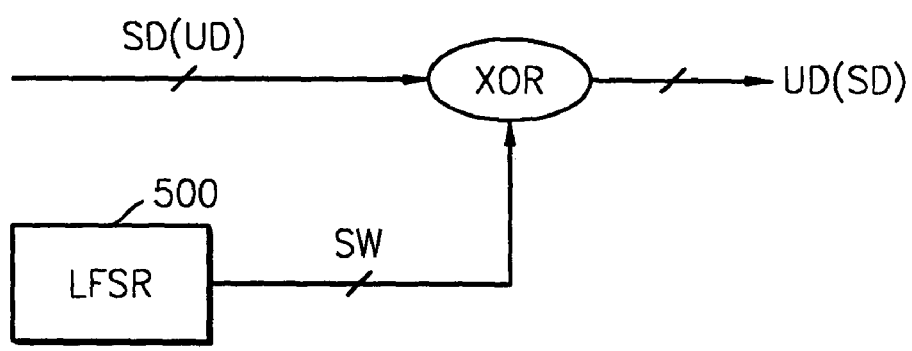
FIG. 4 is a table showing values obtained by performing an XOR logic operation and a shifting operation 8 times using the LFSR shown in FIG. 2.
FIG. 5 is a block diagram of an apparatus for scrambling and descrambling data according to an embodiment of the present invention.

FIG. 5 is a block diagram of an apparatus for scrambling and descrambling data according to a preferred embodiment of the present invention. As shown in FIG. 5, the apparatus for scrambling and descrambling data includes an LFSR 500. In the case of descrambling data, an XOR logic operation is performed on every bit of scrambled data SD and a scrambling word SW generated by the LFSR 500, and then descrambled data UD are output. In the case of scrambling data, an XOR logic operation is performed on every bit of the descrambled data UD subjected to scrambling, and the scrambling word SW, and then the scrambled data SD are output.

Figure 1:
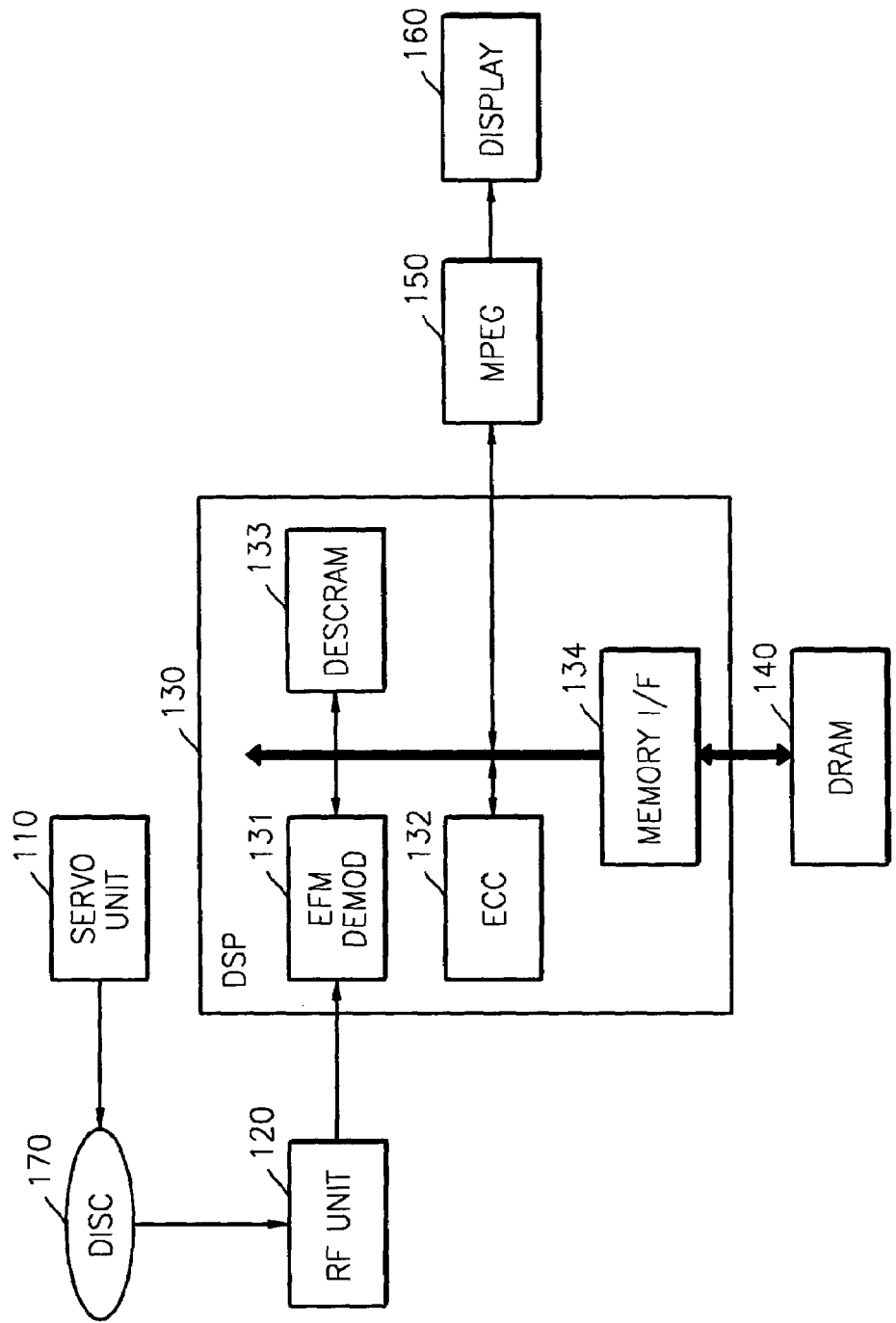
FIG. 1 is a block diagram of a conventional optical disk reproducer.
Figures 2, 3:
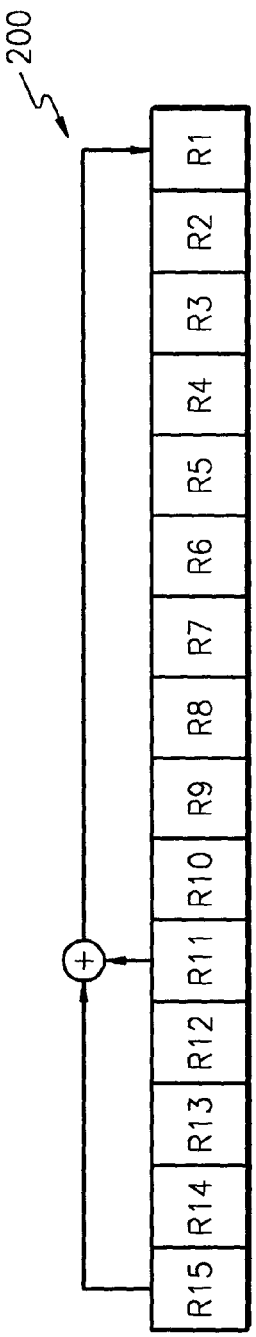
FIG. 2 is a diagram illustrating a linear shift feedback register (LFSR) for generating scrambling bytes following DVD standards.
FIG. 3 is a table showing initial setting values of the LFSR shown in FIG. 2 and their respective initial values.
Figure 6:
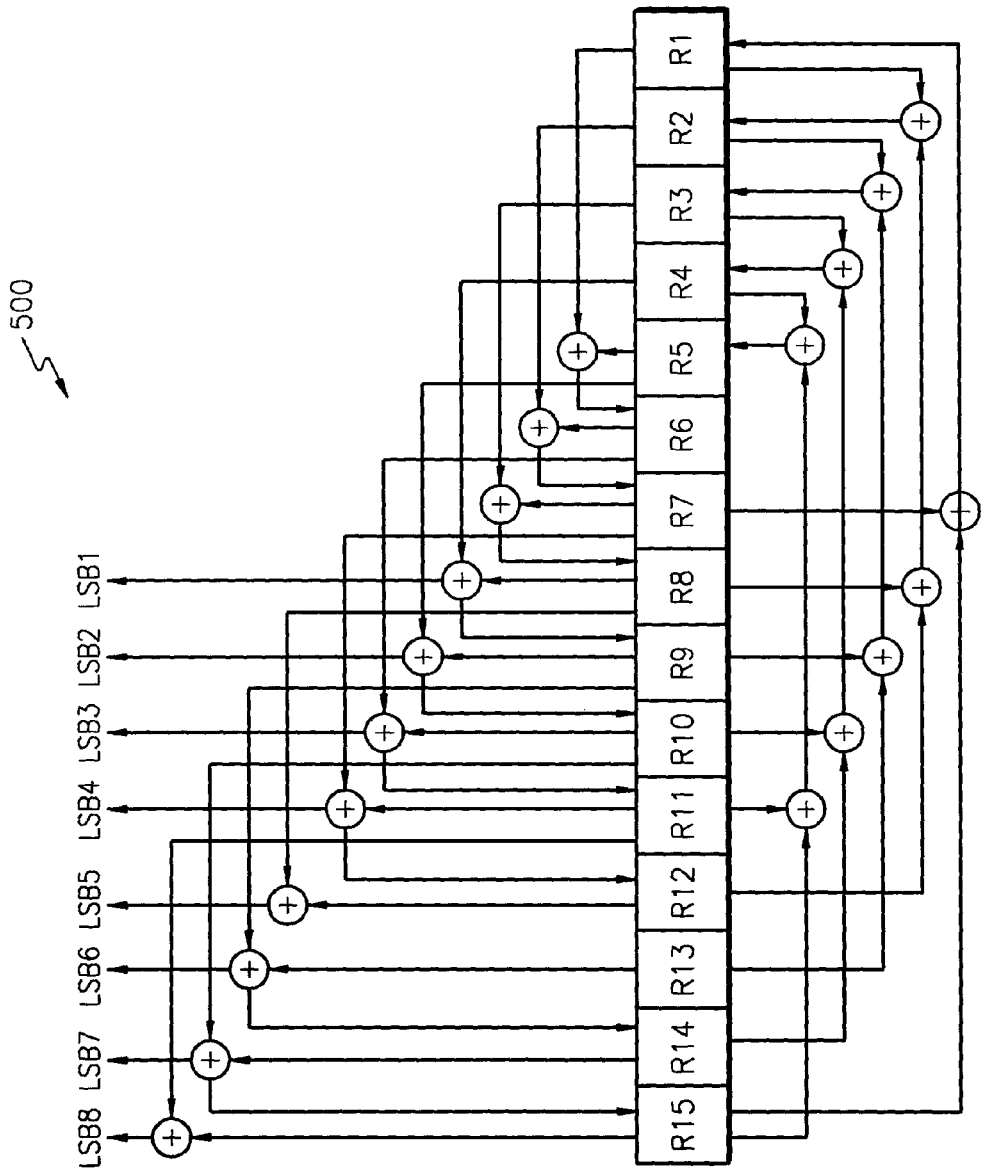
FIG. 6 is a circuit diagram of a LFSR shown in FIG. 5.

FIG. 6 is a circuit diagram of the LFSR 500 shown in FIG. 5. As shown in FIG. 6, the LFSR 500 includes 15 bits. The LFSR 500 is initialised to initial values corresponding to initial setting values shown in FIG. 2. The operation of the LFSR 500 during one clock cycle is in accordance with the following.

The LFSR 500 performs an XOR logic operation on a first bit R1 and a fifth bit R5 and stores the result of the XOR logic operation in a sixth bit R6. At the same time, the LFSR 500 performs an XOR logic operation on a second bit R2 and the sixth bit R6, a third bit R3 and a seventh bit R7, a fourth bit R4 and an eighth bit R8, the fifth bit R5 and a ninth bit R9, the sixth bit R6 and a tenth bit R10, the seventh bit R7 and an eleventh bit R11, the eighth bit R8 and a twelfth bit R12, a ninth bit R9 and a thirteenth bit R13, and a tenth bit 10 and a fourteenth bit R14, and stores the results of the XOR logic operations in the seventh through fifteenth bits R7 through R15, respectively.

At the same time, the LFSR 500 performs an XOR logic operation on the seventh bit R7 and the fifteenth bit R15, the first bit R1, the eighth bit R8 and the twelfth bit R12, the second bit R2, the ninth bit R9 and the thirteenth bit R13, the third bit R3, the tenth bit R10 and the fourteenth bit R14, and the fourth bit R4, the eleventh bit R11 and the fifteenth bit R15, and stores the results of the XOR logic operations in the first through fifth bits R1 through R5, respectively.

Among the first through fifteenth bits R1 through R15 having been through the aforementioned process, the first through eighth bits R1 through R8 are used as an upper scrambling byte (USB) of the scrambling word SW.

As described above, the LFSR 500 outputs a lower scrambling byte (LSB) during calculating the first through fifteenth bits R1 through R15 for a clock cycle n+1. The LFSR 500 outputs the results of performing an XOR logic operation on eight pairs of bits among the first through fifteenth bits R1 through R15, in a previous clock cycle n as first through eighth bits LSB1 through LSB8 of a lower scrambling byte (LSB), respectively. The eight pairs of bits are the fourth bit R4 and the eight bit R8, the fifth bit R5 and the ninth bit R9, the sixth bit R6 and the tenth bit R10, the seventh bit R7 and the eleventh bit R11, the eighth bit R8 and the twelfth bit R12, the ninth bit R9 and the thirteenth bit R13, the tenth bit R10 and the fourteenth bit R14, and the eleventh bit R11 and the fifteenth bit R15.

In the present invention, 16 bits of a scrambling byte are calculated and output in parallel during one clock cycle, and accordingly, the time taken to scramble and descramble data decreases, as compared with the prior art in which 8 bits of a scrambling byte are calculated and then 8 bits of a following scrambling byte are calculated. That is, since 8 bits of a scrambling byte are generated at a time in the prior art, only 8 bits of data can be scrambled and descrambled at a time. On the other hand, since in the present invention, a scrambling word is generated wordwise, i.e., two bytes of a scrambling word are generated at a time, it is possible to scramble and descramble data wordwise.

FIG. 7 is a table showing the results of performing a predetermined operation using the LFSR 500 shown in FIG. 6 during one clock cycle. As a result of the predetermined operation performed in the LFSR 500, first through fifteenth bits LFSR(n+1) of the LFSR 500 for a following clock cycle n+1, 8 bits of an upper scrambling byte USB, and 8 bits of a lower scrambling byte LSB are obtained.

As a result of the operation of the LFSR 500 shown in FIG. 6, the first through fifteenth bits LFSR(n+1) in the following clock cycle n+1 are obtained using first through fifteenth bits LFSR(n) of the LFSR 500 in a current clock cycle n, as shown in FIG. 7. Among the first through fifteenth bits LFSR(n+1) of the LFSR 500 in the following clock cycle n+1, the first through eighth bits of the LFSR 500 are used as 8 bits of the upper scrambling byte USB. At the same time, 8 bits of the lower scrambling byte LSB are obtained using the first through fifteenth bits LFSR(n) of the LFSR 500 in the current clock cycle n, as shown in FIG. 7.

Descrambled data are obtained by performing an XOR logic operation on every bit of 16-bit scrambled data and the scrambling word SW consisting of the upper scrambling byte USB and the lower scrambling byte LSB.

In order to access a memory, processes of applying a row address, applying a column address, and reading data from a memory cell corresponding to an address are necessary, and 4 clock cycles are taken to perform such processes in general. Supposing four clock cycles are taken to access a memory, four clock cycles are taken to access 16-bit data according to the present invention. A process of formatting a DVD is performed sectorwise, and one sector of a DVD is comprised of 2048 bytes. Therefore, according to the present invention, 2048*2 clock cycles are needed to access a memory in order to descramble data stored in one sector.

Let us assume that there is a system capable of descrambling data bytewise. Even under the same conditions as in the present invention, the system needs 2048*2 clock cycles to access a memory in order to descramble data stored in one sector. That is, the system requires twice as much time as required in the present invention.

According to the present invention, two scrambling bytes used to scramble and descramble data in an optical disk system are calculated in parallel during one clock cycle. Accordingly, the time taken to scramble and descramble data in an optical disk system decreases, which improves the operational speed of the optical disk system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for scrambling and descrambling data in an optical disk system, the apparatus comprising:
   a shift register which is initialized at a predetermined initial value and which generates 16 bits of a scrambling word at a time using a predetermined parallel operation; and
   an XOR logic operator which performs an XOR logic operation on the scrambling word and every bit of scrambled data or descrambled data corresponding to the scrambling word;
   wherein the shift register performs an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit, and stores the results of the XOR logic operations in the first through fifteenth bits, respectively.

2. The apparatus of claim 1, wherein the shift register is a 15-bit shift register.

3. The apparatus of claim 1, wherein 8 upper bits of the scrambling word are the first through eighth bits of the shift register, and 8 lower bits of the scrambling word are the results of the XOR logic operations performed on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, on the tenth bit and the fourteenth bit, and on the eleventh bit and the fifteenth bit.

4. The apparatus of claim 1, wherein 16 bits of the scrambled data or the descrambled data are read from a memory in the optical disk system in parallel at a time.

5. An apparatus for generating a scrambling word used to scramble and descramble data in an optical disk system, the apparatus comprising:

a bit storing means which stores at least 15 bits; and a calculating means which calculates first through fifteenth bits of the bit storing means in parallel during one clock cycle and inputs the results of the calculation back into the bit storing means, wherein the calculating means performs an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit, and inputs the results of the XOR logic operations into the bit storing means.

6. The apparatus of claim 5, wherein 8 upper bits of the scrambling word are the first through eighth bits of the bit storing means, and 8 lower bits of the scrambling word are the results of the XOR logic operations performed on the fourth bit and the eighth bit, on the fifth bit and the ninth bit, on the sixth bit and the tenth bit, on the seventh bit and the eleventh bit, on the eight bit and the twelfth bit, on the ninth bit and the thirteenth bit, on the tenth bit and the fourteenth bit, and on the eleventh bit and the fifteenth bit.

7. A method of scrambling and descrambling data in an optical disk system, the method comprising:

(a) generating a predetermined scrambling word; and (b) performing an XOR logic operation on the scrambling word and scrambled data or descrambled data, wherein the scrambling word comprises 16 bits and is generated through a parallel operation performed using a shift register and wherein step (a) comprises performing an XOR logic operation on a seventh bit and a fifteenth bit, on a first bit, an eighth bit, and a twelfth bit, on a second bit, a ninth bit, and a thirteenth bit, on a third bit, a tenth bit, and a fourteenth bit, on a fourth bit, an eleventh bit, and a fifteenth bit, on the first bit and a fifth bit, on the second bit and a sixth bit, on a third bit and the seventh bit, on the fourth bit and the eighth bit, on the fifth bit and the ninth bit, on the sixth bit and the tenth bit, on the seventh bit and the eleventh bit, on the eighth bit and the twelfth bit, on the ninth bit and the thirteenth bit, and on the tenth bit and the fourteenth bit, and storing the results of the XOR logic operations in the first through fifteenth bits, respectively.

8. The method of claim 7, wherein the shift register is a 15-bit shift register.

9. The method of claim 1, wherein step (a) comprises:

generating the first through eighth bits of the shift register as 8 upper bits of the scrambling word; and generating the results of the XOR logic operations performed on the fourth bit and the eight bit, on the fifth bit and the ninth bit, on the sixth bit and the tenth bit, on the seventh bit and the eleventh bit, on the eight bit and the twelfth bit, on the ninth bit and the thirteenth bit, on the tenth bit and the fourteenth bit, and on the eleventh bit and the fifteenth bit as 8 lower bits of the scrambling word.

* * * * *